Nov. 18, 1952
D. T. MILNE
2,618,012
METHOD AND APPARATUS FOR TWO-WAY
STRETCHING A CONTINUOUS SHEET
Filed May 14, 1948
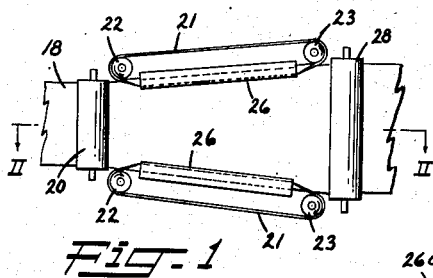
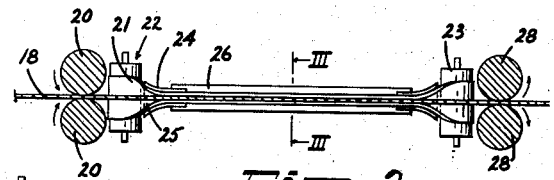
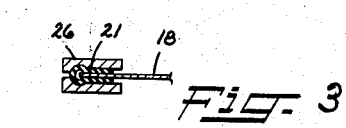
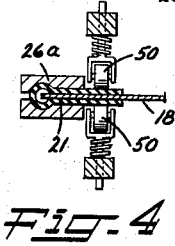
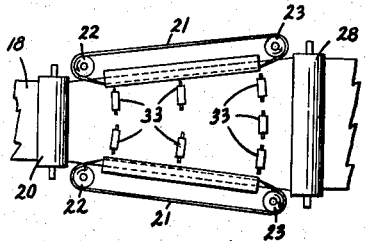
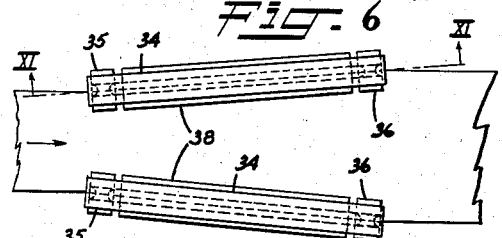
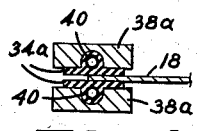
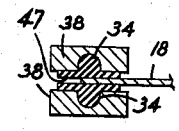
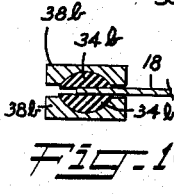
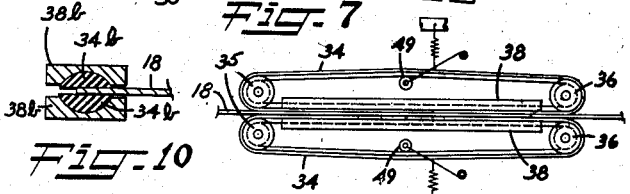
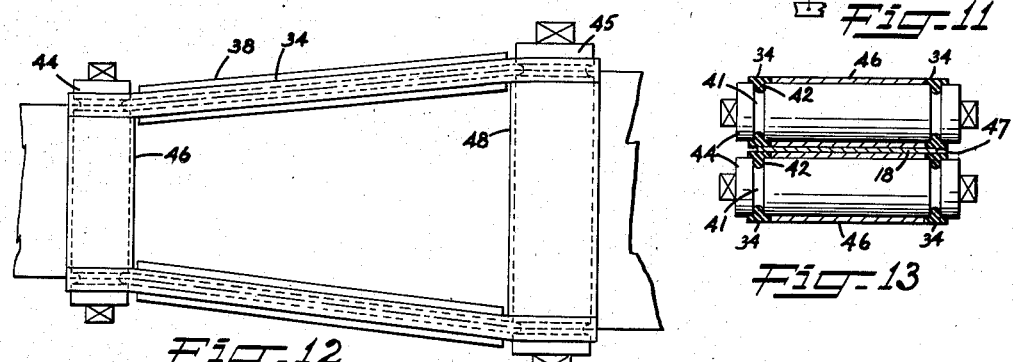
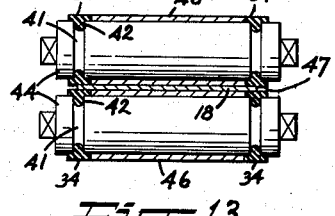
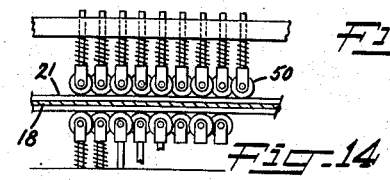
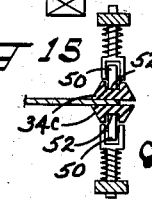
INVENTOR.
DAVID T. MILNE
BY Thomas R. O'Malley
ATTORNEY Patented Nov. 18, 1952

2,618,012

UNITED STATES PATENT OFFICE 2,618,012

METHOD AND APPARATUS FOR TWO-WAY STRETCHING A CONTINUOUS SHEET

David T. Milne, Fredericksburg, Va., assignor to American Viscose Corporation, Wilmington, Del., a corporation of Delaware Application May 14, 1948, Serial No. 26,968

18 Claims. (Cl. 18—1)

This invention relates to improvements in production of sheet materials and particularly to methods and apparatus for stretching such materials.

Improved mechanical or physical properties are imparted to many sheeted films, matted, or woven fabrics or to foil materials by stretching the material transversely and/or longitudinally; some materials are benefited by being stretched in both directions. It is highly advantageous to perform a stretching operation while such materials are in continuous sheet form and while traveling at uniform rates through continuously moving processing machinery. Many expedients are available for stretching the sheeted materials transversely and longitudinally by separate operations, but there are presently no satisfactoy methods by which stretching may be carried out in both directions simultaneously.

It is a principal object of the invention to stretch a running sheet material transversely and longitudinally simultaneously. It is also an object to provide apparatus which positively grips the material along a continuous surface while carrying out the stretching operation in order to avoid localized stretching in the sheeted material. Another object is to provide apparatus which is free from mechanical complexity, simple to construct, adjust and to operate. Other objects, features and advantages will be apparent from the following description and drawings.

In the drawings illustrative of the invention

Fig. 1 is a diagrammatic top view of a sheet material being stretched in apparatus according to one embodiment of the invention;

Fig. 2 is a diagrammatic section of apparatus illustrated in Fig. 1 taken along line II—II;

Fig. 3 is a detailed section of a gripping element and guide therefor taken along line III—III of Fig. 2;

Fig. 4 diagrammatically illustrates a modification of the gripping arrangement seen in Fig. 3;

Fig. 5 is a modification of apparatus illustrated in Fig. 1;

Fig. 6 is another modification of stretching apparatus illustrated in Figs. 1 and 5;

Fig. 7 is still another modification of stretching apparatus;

Figs. 8, 9 and 10 illustrate in section gripping elements and guides therefor which may be used in apparatus shown in Figs. 7 and 12;

Fig. 11 is a longitudinal section of gripping elements and guides therefor taken along line XI—XI of Fig. 7;

Fig. 12 is another modification of apparatus illustrated in Fig. 1;

Fig. 13 illustrates a roll such as used in apparatus of Fig. 12;

Fig. 14 is illustrative of gripping rollers for the sheet material; and

Fig. 15 is illustrative of gripping rollers shown in Fig. 14 used as belt-guiding elements.

Broadly, the invention comprises stretching a running material by employing running extensible belts to grip the edges of the sheet and guiding the belts while gripping the sheet along diverging paths while also applying draft to the belt to extend those portions gripping the sheet. By this treatment the sheet is stretched transversely and longitudinally in a single drafting operation. Each edge of the sheet may be gripped by a pair of coextensive belts presenting common flat surfaces to each other, or by a single belt which is folded and compressed around the edge of the sheet sandwich-fashion by guides therefor. The belts are preferably of endless elastic construction of a material such as a vulcanized composition containing rubber or a synthetic rubber-like polymerizate. The belts may be propelled by the rollers about which they travel, in which case the rollers at the sheet discharging ends of the belts are driven at higher peripheral speed than those at the sheet-gripping portions of the belts. The two-directional stretching process may be aided by auxiliary belts or rolls spaced intermediately over both sides of the sheet in the stretching region defined by the belts just referred to and hereinafter described.

Fig. 1 illustrates a sheeted material 18 entering a pair of horizontal nip rolls 20. After entering the rolls 20, the sheet is gripped by belts 21 traveling about the vertical rolls 22 and 23. The belts 21 are caused to grip sheet 18 by passing through narrowing or belt folding guides 24 shown in Fig. 2 which double the belts around the edges of the sheet 18 while the sheet is passing into the folded sections 25 of belts 21. The edge of the sheet thereafter becomes sandwiched between adjacent surfaces of the folded belt. After passing through the guide 24, the belt containing an edge of the sheeted material passes into an elongate guide 26, the upper and lower members of which bear against the exterior surface of the folded belt 18 and thus cause the belt to clamp the sheet tightly. As pairs of guides and belts on opposite sides of the sheet 18 diverge along the region extending between nip rolls 20 and a longer set of sheet discharging nip rolls 28, the sheeted material is subject to transverse stretching. The rolls 23 adjacent the nip rolls 28 are rotated at a higher peripheral speed than the rolls 22. Stretching is produced in the portion of belts 21 extending between rolls 22 and 23 and through the guides 26.

The belts are subject to frictional forces imposed by the guides 26, which may be controlled in any manner desired by varying the distribution of pressure applied at various points along the guides 26. In order to minimize the friction produced by contact of the belt 21 with the guide 26, water or other lubricating material may be distributed upon the outer surface of the belt just before it passes into the guide 26; or lubricating material may be forced through the walls of the guides through ducts drilled thereinto.

As shown in the drawing, the pairs of nip rolls 20 and 28 are spaced longitudinally along the sheet outside of the region gripped by elements such as the belts 21 of Figs. 1, 2, 5 and 6. If desired, the nip rolls may be positioned within the stretching region for the sheet defined by the belt guides for more continuous gripping of the sheet after it enters the region.

Fig. 5 illustrates diagrammatically the use of auxiliary extensible belts 30 and 31 contacting the sheeted material at regions transversely intermediate of the edges of the sheet 18. In the top view shown in Fig. 5 only the belts above the sheet are seen. However, for each of the belts 30 and 31 there is a similar co-extensive belt beneath the sheet whereby the upper and lower belts cooperate to grip the sheet.

In Fig. 6 still another arrangement is shown in which driven rolls 33 are supported above and below the sheet 18 in pairs which cooperate to grip the sheet at various points along the surface of the sheet in the region in which stretching is carried out. The peripheral speed of these rolls is graduated between the peripheral speed of rolls 22 and 23 depending on their location in a longitudinal direction along the sheet in the region between rolls 22 and 23. For example, the rolls 33 closer to the sheet-discharging rolls 28 rotate at a higher peripheral speed than the rolls 33 which are adjacent to the sheet-receiving rolls 20.

Fig. 7 illustrates use of sheet-extending belts according to the invention in the absence of nip rolls 20 and 28 such as illustrated in Fig. 1. Belts 34 for gripping the edges of the sheeted material differ from those illustrated in any of the previous figures. Instead of employing a single belt for gripping each side of the sheet, a pair of belts such as those illustrated in the cross-sectional views Figs. 8, 9, and 10, numerals 34, 34a and 34b, are used to grip each edge. However, sheet-extending belts as shown in Fig. 7 may readily be used in connection with sheet-receiving and sheet-discharging nip rolls such as rolls 20 and 28 shown in Fig. 1.

Fig. 11 is a sectional view of these belts, pulleys, and guides therefor taken along line XI—XI of Fig. 7. As in the previous illustrations of the invention, the rolls 36, positioned at the sheet-discharging region, rotate at faster peripheral speed than the rolls 35 at the receiving region. The belts 34 may be of cross sectional contours shown in Figs. 8, 9 and 10 or any other shape which gives positive guiding and retention of the belt in belt guides such as guides 38, 38a and 38b. As shown in Fig. 9 a spiral steel spring 40 may be vulcanized or otherwise included within the main body of the extensible belt 34a.

In Fig. 12 is shown a modification wherein nip rolls may be used to drive and guide the extensible belts 34 of the type shown in Figs. 8, 9 and 10, and also to transversely grip the sheet at the entrance and discharge regions. Rolls are of the contour illustrated in Fig. 13 having grooves 41 at either end of the sheet bearing surface for receiving a belt guide ridge, such as ridge 42 of the belt 34. The grooves 41 are spaced near opposite ends of rolls 44 and 45 for alignment with the corresponding guiding grooves of the guides 38. As the guides 38 diverge from each other in extending between entrance nip rolls 44 and discharge rolls 45, the guide grooves 41 of rolls 45 are necessarily spaced farther apart than grooves of similar function on rolls 44. The cylindrical surfaces of rolls 44 and 45 extending between the surfaces of these rolls traversed and covered by the belts 34, are covered by sleeves 46 and 48 comprising a material having a resiliency similar to that of the material forming the belts 34. These bushings are also of the same thickness as the flat portion 47 of the belt 34 in order that the surface across the sheet contacting area of the rolls 44 and 45 when covered by the belts and sleeves, shall be entirely smooth and continuous.

As an essential feature of the invention the sheet-gripping belts are extended in the portions traveling through the belt guides and in contact with the sheet. The portions of belts traversing the return path, that is, from the rollers at the sheet-discharging region to the rollers at sheet-engaging region are subject to relaxation or even compression which causes slack in the returning portions of the belt. The sheet-stretching belts may be installed upon the rollers under considerable initial tension and elastic elongation so that during the stretching operation the sheet-engaging portions merely undergo greater elongation and the returning portions relax but do not become appreciably slack. However if the belts are installed while under no appreciable elastic elongation slackness in the returning portions of the belt may result from elongation of the sheet engaging portions. To prevent the occurrence of slackness the sheet-stretching belts may be run over a slack take-up such as idler rollers 49 shown in Fig. 11.

Fig. 14 shows sheet or belt gripping rollers 50 which may be employed to aid the belts in gripping the edges of sheet materials in opposing the transverse pull tending to pull the edges of the sheet out of gripping engagement by the stretching belts. The rollers may be closely spaced to avoid excessive local stress concentrations in the sheet material, and for very close spacing, they may be staggered to overlap as shown in Fig. 14. Each roller 50 is separately resiliently or spring supported. While they may be in direct contact with the sheet itself, they preferably press upon the outer surface along a margin of each of the belts. They are illustrated in Fig. 4 for use with the belt 21 but such rollers may be used on any belt according to this invention including auxiliary belts 30 and 31. In using rollers 50, sheet-gripping belts such as belts 21 and 34 are of sufficient width that edges thereof extend inwardly over the sheet surface beyond the guides 26 or 38 to provide an exposed surface for engagement by the rollers 50. An assembly of rollers such as shown in Fig. 14 may be used to guide sheet-gripping belts of appropriate cross-sectional contour. Fig. 15 illustrates belts 34c, seen in cross section, in position for passing along a path tangential to the rollers 50. The belts are maintained along a desired path by following a series of rollers 50 extending into guide grooves 52 of the belts.

While the various embodiments of the invention illustrated in the drawing have been described as a means for simultaneously stretching a sheet material longitudinally and transversely, such apparatus may, by rearrangement of the belt guides and/or by varying the speeds of the driving rolls for the sheet-gripping belts and/or by varying the speeds of the nip rolls, be used to impart various degrees or types of stretching to the sheet. For example, by maintaining the belt guides in converging alignment instead of the diverging arrangement shown in the drawing, the sheet may be stretched longitudinally while it undergoes contraction transversely. By rotating the driving rolls for the belts at identical peripheral speeds while maintaining the belt guide in diverging alignment, and by driving the sheet receiving and the sheet-discharging nip rolls at the same peripheral speed, if such rolls are employed, the sheet may be stretched transversely but not longitudinally. Thus by manipulation of roll speeds and/or the arrangement of the belt guides, the sheet may be stretched, held, or relaxed transversely or longitudinally as desired.

The sheet stretching apparatus herein described may be used on any type of sheeted material such as woven, knitted, or matted fabrics, films of cellulose esters and films of regenerated cellulose, polyvinyl and polyvinylidene types of resins, nylon, rubber hydrochloride, and films and sheets of other elastomeric and/or thermoplastic resins.

For stretching or extending materials which have no elasticity or plasticity such as matted or non-woven fibrous sheets, a sheet of the material may be fed into apparatus such as that herein described and illustrated between two running, resilient and coextensive sheets which undergo temporary stretching while passing through the apparatus and subject the sheet sandwiched therebetween to permanent extension. The resilient sheets may be collected on rolls (not shown) positioned beyond the stretching apparatus while the extended sheet material is carried to a more remote collecting means.

In stretching some materials it is necessary to subject them to thermal treatment prior to or during the stretching operation. Heating the running sheet is readily effected by such media as heated sheet-receiving nip rolls, high frequency electrical apparatus, hot plates and infra-red lamps located under and/or above the sheet in the region of stretching, on or adjacent to the stretching apparatus described. Apparatus may also be provided for cooling the heated sheet on or adjacent to the stretching apparatus. For example, a cooling liquid can be circulated through the nip rolls which discharge the stretched sheet, or an air blast or liquid may be directed against the sheet.

While preferred embodiments have been shown it is to be understood that changes and variations may be made without departing from the spirit and scope of the invention as defined in the appended claims.

I claim:

1. Apparatus for longitudinally and transversely stretching a running sheet of material comprising extensible belts for simultaneously frictionally gripping both edges of the sheet, divergent guides for the sheet-gripping portions of the belts defining a sheet-receiving region between the closer ends of the guides and a sheet-discharging region between the other ends thereof, and tension means for longitudinally stretching the portions of the belts in gripping contact with the sheet, said belts and guides being complementarily ridged and grooved in a longitudinal direction for limiting movement of each belt to the path defined by its respective guide.

2. Apparatus for simultaneously stretching a running sheet of material longitudinally and transversely comprising extensible belts for simultaneously frictionally gripping opposite surfaces of each of both edges of the sheet, diverging guides for the sheet-gripping portions of the belts disposed with the closer ends spaced to receive an unstretched sheet, and tension means for longitudinally stretching the portion of the belts in gripping contact with the sheet, said belts and guides being complementarily ridged and grooved in a longitudinally direction for limiting movement of each belt to the path defined by its respective guide.

3. Apparatus for simultaneously stretching a running sheet of material longitudinally and transversely comprising a pair of feed rolls, extensible belts for simultaneously frictionally gripping opposite surfaces of each of both edges of the sheet as it is discharged by the feed rolls, divergent guides for the sheet-gripping portions of the belts having their closer ends adjacent the feed rolls, tension means for longitudinally stretching portions of the belts in gripping-engagement with the sheet, and nip rolls for receiving the sheet from the extensible belts, said belts and guides being complementarily ridged and grooved in a longitudinal direction for limiting movement of each belt to the path defined by its respective guide.

4. Apparatus for simultaneously stretching a running sheet of material longitudinally and laterally comprising a pair of extensible flat belts disposed along opposite sides of a stretching region traversed by the sheet, divergent guides at opposite sides of the region for engaging and guiding the belts, said guides having the ends thereof at one end of the region spaced closer than at the other end of the region to receive an unstretched sheet, rollers positioned adjacent the ends of the divergent guides for supporting the belts, said rollers having axes approximately normal to the plane of the sheet, a narrowing guide positioned between each end of the divergent guides and the adjacent roller of the more closely spaced ends of the divergent guides for folding each belt sandwich-fashion about the opposite ends of the sheet and for guiding the folded belts into corresponding divergent guides, means for driving the rollers positioned near the more closely spaced ends of the divergent guides, and means for driving the rollers positioned at the more widely spaced ends of the divergent guides at a higher peripheral speed than that of the rollers near the more closely spaced ends.

5. Apparatus for simultaneously stretching a running sheet of material longitudinally and laterally comprising a pair of extensible flat belts disposed along opposite sides of a stretching region traversed by the sheet, divergent guides at opposite sides of the region for engaging and guiding the belts, said guides having the ends thereof at one end of the region spaced closer than at the other end of the region, a roller at each end of the divergent guides for supporting the belts, said rollers having axes approximately normal to the plane of the sheet when the latter extends between the guides, narrowing-guides positioned adjacent the more closely spaced ends of the divergent guides for holding each belt sandwich-fashion about the opposite edges of the sheet as it enters the region at the more closely spaced ends of the divergent guides, said narrowing guides being positioned between said guide ends and the corresponding adjacent rollers for guiding the folded belt into the divergent guides, means for driving the pair of rollers positioned nearer the more closely spaced ends of the divergent guides, means for driving the rollers positioned at the more widely spaced ends of the divergent guides at higher peripheral speed than the rollers near the more closely spaced ends, a pair of nip rollers positioned exteriorly and transversely with respect to the region near said more closely spaced guide ends for feeding the sheet into the region, and a pair of nip rollers positioned adjacent said more widely spaced guide ends for withdrawing the stretched sheet from the region.

6. Apparatus for simultaneously stretching a running sheet of material longitudinally and transversely comprising two diverging pairs of extensible belts spaced to grip opposite edges of the sheet, rollers for supporting the belts having axes approximately parallel to the plane of the sheet, a guide extending between the rollers supporting each belt, said guide positioned to hold the belt for movement therealong in contact with the sheet along a predetermined path between said rollers, and means for producing extension in the belts in said regions, said belts and guides being complementarily ridged and grooved in a longitudinal direction for limiting movement of each belt to the path defined by its respective guide.

7. Apparatus for simultaneously stretching a running sheet of material longitudinally and transversely comprising two diverging pairs of extensible belts for gripping opposite edges of the sheet, a pair of rollers for supporting each belt having axes approximately parallel to the plane of the sheet and spaced so that a belt gripping region having a sheet receiving and sheet discharging portion is formed by adjacent and coextensive surfaces of each pair of belts, driving means for the rollers supported at the sheet-receiving ends thereof, driving means for imparting greater peripheral speed to the rollers at the sheet discharging ends of the belts, and a guide extending between the rollers supporting each belt, said guide positioned to hold the belt for movement therealong in contact with the sheet along a predetermined path between said rollers, said belts and guides being complementarily ridged and grooved in a longitudinal direction for limiting movement of each belt to the path defined by its respective guide.

8. Apparatus for simultaneously stretching a running sheet of material longitudinally and transversely comprising a sheet-receiving pair of power-driven nip rolls each of which has annular grooves along its cylindrical surface spaced apart the width of an unstretched sheet, a longer pair of sheet-discharging power-driven nip rolls rotatable at a higher peripheral speed than the sheet-receiving rolls having annular grooves spaced apart the width of a stretched sheet, sheet-engaging extensible belts extending around the upper rolls of the two pairs of rolls, and cooperating and coextensive belts extending around the lower rolls forming thereby sheet-gripping regions between cooperating pairs of belts, and a guide extending between the rolls supporting each belt, said guide positioned to hold the belt for movement therealong in contact with the sheet along a predetermined path between said rolls, said belts and guides being complementarily ridged and grooved in a longitudinal direction for limiting movement of each belt to the path defined by its respective guide.

9. Apparatus for simultaneously stretching a running sheet of material longitudinally and transversely comprising a sheet-receiving pair of power-driven nip rolls having similarly spaced annular belt-guiding grooves along their cylindrical surfaces, a sheet-discharging pair of nip rolls having belt guiding grooves spaced farther apart than the sheet-receiving rolls, means for driving the second-mentioned pair of nip rolls at a higher peripheral speed than the shorter rolls, a pair of extensible belts extending around a sheet-receiving roll and a sheet-discharging roll disposed to one side of the path traversed by the sheet, each of the belts having continuous ridged portions along its inner side for fitting into the grooves of the rolls, another similar pair of belts extending about the sheet-receiving roll and the sheet-discharging roll disposed on the other side of the sheet path through the two pairs of rolls, and guide means for each belt having a grooved surface complementary to the ridged portions of the belt, said guide means extending between the grooves of the sheet-discharging roll and the sheet-receiving roll traversed by said belt and positioned to hold the sheet firmly in contact with an opposing belt.

10. An apparatus as in claim 9 wherein the cylindrical surface of each roll extending between the portions traversed by the extensible belts is covered by a sleeve of resilient material having a thickness approximately equal to the edge portions of the belts.

11. An apparatus as in claim 9 wherein the extensible belts and the guide grooves therefor about the sheet receiving rolls are spaced for gripping the edges of an unstretched sheet.

12. A method of treating a running sheet material comprising passing the material through a region in which stretching is to be effected, frictionally gripping opposite surfaces of both edges along the portions of the material passing through the region in unbroken contact with said surfaces along the entire length of the region, and simultaneously stretching the material laterally as well as longitudinally in all portions of the region.

13. A method of simultaneously stretching a running sheet material transversely and longitudinally comprising feeding a sheet between two spaced pairs of running and converging elastic surfaces, simultaneously and positively guiding the converged portions of each pair of surfaces along diverging paths and elongating equally each pair of surfaces in contact with the sheet in the direction parallel to their movement, and thereafter separating the surfaces at the end of the path.

14. A method of simultaneously stretching a running sheet material transversely and longitudinally comprising passing an unstretched sheet through a pair of nip rolls, gripping the sheet discharged from the rolls between spaced pairs of running and converging surfaces of elastic gripping means, simultaneously and positively guiding the converged portions of each pair of surfaces along diverging paths and elongating equally each pair of gripping means in a direction parallel to their movement to produce a uniformly stretched sheet, thereafter separating the gripping surfaces at the ends of the paths, and passing the stretched sheet released by the gripping means through a second pair of nip rolls.

15. A method of simultaneously stretching a running sheet material transversely and longitudinally comprising passing an unstretched sheet between running gripping surfaces extending transversely of the sheet, passing the sheet between running pairs of elastic surfaces spaced for gripping different transverse portions of the sheet contiguously with the transverse gripping surfaces, simultaneously and positively guiding the pairs of elastic surfaces gripping different transverse portions along diverging paths and elongating the elastic surfaces while in contact with the sheet in a direction parallel to their movement, and passing the stretched sheet through running surfaces extending transversely to the stretched sheet contiguously with the elastic surfaces.

16. Apparatus for simultaneously stretching a running sheet of material longitudinally and transversely comprising two pairs of extensible belts spaced to grip opposite edges of the sheet, rollers for supporting the belts having axes approximately parallel to the plane of the sheet, guides for portions of the belts along the sheet-gripping regions comprising a series of small resiliently supported rollers, grooved surfaces extending longitudinally of the outer sides of the belts for receiving the small rollers and guiding the belts therealong, and means for producing extension in the belts.

17. A method of treating a running sheet material comprising passing the material through a region in which stretching is to be effected, frictionally gripping opposite surfaces of both edges along the portions of the material passing through the region in unbroken contact with said surfaces along the entire length of the region, and simultaneously stretching the material laterally as well as longitudinally in all portions of the region while passing these edges along diverging paths.

18. The process of stretching thermostretchable film material which comprises continuously passing the film longitudinally through a zone, heating the film therein and frictionally gripping it along its edges as it passes therethrough, controlling the frictional forces of the grip by applying pressure at various points along the edges, and then stretching the film simultaneously in two directions substantially perpendicular to one another by withdrawing the film from the zone at a higher rate of speed than it is introduced therein, and simultaneously separating the gripping means laterally as they proceed through the zone.

DAVID T. MILNE.

REFERENCES CITED

The following references are of record in the file of this patent:

UNITED STATES PATENTS

| Number | Name | Date |
|---|---|---|
| 127,691 | Hild | June 11, 1872 |
| 1,658,094 | Paschen et al. | Feb. 7, 1928 |
| 1,658,095 | Paschen | Feb. 7, 1928 |
| 1,808,525 | Cadden | June 2, 1931 |
| 2,334,022 | Minich | Nov. 9, 1943 |
| 2,387,333 | Kuzinski | Oct. 23, 1945 |
| 2,490,781 | Cloud | Dec. 13, 1949 |

FOREIGN PATENTS

| Number | Country | Date |
|---|---|---|
| 400,597 | Great Britain | Apr. 21, 1933 |